(12) United States Patent
Schellenbach

(10) Patent No.: US 6,450,126 B1
(45) Date of Patent: Sep. 17, 2002

(54) BODY MOUNTABLE BIRD PERCH

(76) Inventor: Renay D. Schellenbach, 10542 Montego Dr., San Diego, CA (US) 92124

( * ) Notice: Subject to any disclaimer, the term of this patent is extended or adjusted under 35 U.S.C. 154(b) by 0 days.

(21) Appl. No.: 09/706,245

(22) Filed: Nov. 3, 2000

(51) Int. Cl.⁷ .............................................. A01K 31/12
(52) U.S. Cl. ........................ 119/537; 119/531; 119/714; 2/461
(58) Field of Search ................................ 119/714, 713, 119/717, 531, 537; 2/46, 459, 461, 462, 16

(56) References Cited

U.S. PATENT DOCUMENTS

| | | | | |
|---|---|---|---|---|
| 1,084,233 A | * | 1/1914 | Roarke | 2/273 |
| 1,741,060 A | * | 12/1929 | Levenson | 2/132 |
| 2,499,689 A | * | 3/1950 | Sossamon | 2/46 |
| 4,068,313 A | * | 1/1978 | Goldman | 2/49.1 |
| 4,139,912 A | * | 2/1979 | Thuaud | 2/50 |
| 4,807,568 A | * | 2/1989 | Perry et al. | 119/537 |
| 4,919,081 A | * | 4/1990 | Lewellen | 119/537 |
| 5,331,921 A | * | 7/1994 | vanVonno | 119/537 |
| 5,363,803 A | * | 11/1994 | Serro | 119/537 |
| 5,465,425 A | * | 11/1995 | Crispin | 2/102 |
| 5,664,258 A | * | 9/1997 | Harris | 2/69 |
| 5,996,127 A | * | 12/1999 | Leslie | 119/715 |
| 6,209,134 B1 | * | 4/2001 | Schiesel | 2/102 |

\* cited by examiner

Primary Examiner—Yvonne R. Abbott
(74) Attorney, Agent, or Firm—Donn K. Harms

(57) ABSTRACT

A garment for the transporting, training and displaying pet birds on the shoulder of their owners. The garment consists of two front panels and a back panel joined at the shoulders with the front panels removably attachable to each other using adjustable fasteners. At the apex of the shoulders are removable wooden dowels that are attachable with ties or similar mounting, which provide perches for the pet birds to hold onto. The ties or similar fasteners also provide attachment to the garment for toys and paraphernalia to entertain the bird and to adorn the garment. This garment allows that the bird has a natural removable wooden perch to hold onto and the owner has the ability to hold and transport his pet bird without damaging or soiling his clothing. Also, the owner can remove the perches for laundering the garment and the perches may be provided in a plurality of different diameters to allow mounting of the appropriate sized perch for the grip size of the bird.

18 Claims, 1 Drawing Sheet

BODY MOUNTABLE BIRD PERCH

FIELD OF THE INVENTION

The invention relates to a garment to be worn by the user for clothing protection and to provide an animal mount. More particularly, this invention relates to a short, very colorful vest-like garment with removable and adjustable wood dowels attached to the apex of one or both shoulders by ties. The dowels form perches for pet birds to be carried thereon with the ties also used to attach a plurality of different sized dowels and toys for entertainment. This garment will can used to protect the clothing of the person and to show off and train small to medium-sized birds and provide perches onto which the bird can grasp while riding on the owner's shoulder.

BACKGROUND OF THE INVENTION

Individuals who have birds for pets often relate closely to them and like to show them off and train them out of their cages; many go so far as to take the birds on walks to the park or to the beach. Carrying small to medium-sized birds on the shoulder is the most natural place for them. In training, young birds are comfortable around the head of a person as opposed to their hands, because the hands move too quickly and scare the young birds. Birds also relate to bright colors and toys, especially if it is an individual bird without a mate. Birds have a great curiosity and tend to bite and pick on anything loose or colorful around them. It is not uncommon in the case where a person cares for a bird to have the cage filled with mirrors, bells and all forms of toys. In this close relationship with people some birds will start to mimic the act of talking quickly. Medium-sized birds tend to dig their talons or claws into the material on the garment worn by the individual holding the bird, sometimes damaging the clothing and even causing pain to the person holding the bird. Birds have the natural instinct to wrap their claws around objects, attempting to maintain their position on an unstable perch. This is why they will dig their claws into the person's shoulder when there is any unexpected movement. Another problem arises when the bird relieves itself, which is quite often. The droppings of small to medium-sized birds are not excessively large and generally dry quickly without any noticeable odor but may stain or discolor clothing and it is very unsightly. It is not uncommon to have to change clothing after handling a pet bird.

A number of shoulder drapes with perches have been developed, most inclined to locate over one shoulder with some form of waste collecting receptacle to the rear. Although birds do tend to face forward most of the time, they also tend to be very mobile, turning often with no guarantee that they will turn to the front to relieve themselves to the rear.

U.S. Pat. No. 4,807,568 of Ronald E. Perry describes a shoulder draped bird perch which includes a shoulder conformable, covered base which is set on a person's shoulder. The base covering is claw graspable and protects the person from claw-induced injury and soiling by bird droppings. Anti-slip surface cooperates to retain the perch on a person's shoulder. This device covering only one shoulder, with no separate perch device, has only a claw graspable coarse covering that would be more inclined for use with larger birds with heavy talons that can do a lot of damage. It has no ornamental features desirable for entertaining and training small to medium-sized birds and could not be made of a variety of different brightly colored fabrics. This type of article would be more of a protective device for large birds than a garment worn for showing off and training small to medium birds, though without being secured to the body firmly it will not give the bird a stable feeling and may inadvertently move.

U.S. Pat. No. 5,363,803 of Tony Serro discloses a portable bird perch designed for carrying and displaying pet birds, from a Parakeet to a Peacock, on the shoulder of the user, in an easily adjusted and thereby comfortable manner, both for the bird and the user. The invention teaches of a radially curved support base, designed for riding upon the shoulder of the user, and configured to be affixed to the user via adjustable straps passed about the under arms of the user. This is another rigid device used to protect only one shoulder, requiring the bird to always face forward and could not be called an ornamental garment.

U.S. Pat. No. 5,331,921 of Karl T. van Vonno teaches of a shoulder mounted bird perch having a removable waste-collecting receptacle. This is a shoulder-mounted bird perch comprising a flexible shoulder cover, a perch assembly mounted upon the shoulder cover and a demountable waste receptacle also mounted on the shoulder cover to the rear of the perch assembly. This is another device to cover one shoulder, requiring the bird to face forward with the added feature that the droppings all fall the same distance from the perch no matter what the size of the bird. This device cannot be called an ornamental garment.

U.S. Pat. No. 4,919,081 of Jim A. Lewellen describes a protective cover assembly for supporting a bird on a wearer's shoulder in such a manner that the wearer's garments are not soiled by the bird. This article includes a plurality of plies and a bird perch which is sized and shaped to be securely mounted on the wearer's shoulders. The cover can include a drape and arm cover that are releasably attached. This protector may be classified as a garment itself in that it covers both shoulders, but as described it must be pulled over the head and snapped together around the neck. Some people do not wish to pull garments over their head, messing their hair and thereafter risk removing a possibly bird-soiled garment over the head.

At least one of the panels is adapted to be fluid repellant and the other panel is adapted to be easily cleaned, and the panels are reasonably attached together. With this protective cover the droppings from the bird will easily slide off to the floor or furniture which may be an even greater problem than soiling one's clothing. This type of garment can also stop any circulation of air in the area covered, causing the individual to perspire in the area covered. This protector offers no means of attachment of toys to entertain the birds.

There is as such a pressing need in the field of garment design for new shoulder worn device to provide a secure and stable mount for wearer's owning birds. This new article has been designed with the unique features to show off and enhance the colors of the pet bird, while entertaining, training it to ride on the shoulder and going for walks, along with protecting the wearer's clothing from being soiled by the droppings. This article allows that the bird may sit on a natural round wooden perch

SUMMARY OF THE INVENTION

The above-noted problems, and others, are overcome by the body perch garment of this invention which basically covers the front and back shoulder area of the wearer, opening at the front with any one of a number of conventional attachment means. Two wooden dowels, drilled in both ends allows ties to pass through to releasably attach the dowels on the apex of each shoulder of the so described garment. A plurality of dowels used for bird perches come in varying sizes for different sizes of birds, and different types of wood for lasting hardness are available. Additional removable dowels can be added to the front or rear of the garment forming a ladder, in the same disclosed manner further enhancing the garment, and remaining within the scope of this invention. The ties also provide a means whereby toys and other entertainment paraphernalia are attached to the garment. It is foreseen that some people will enjoy covering the complete front of their garment with toys, bells, mirrors, and buttons along with any other items the bird would play with or which they wish to display. These garments as in all garments will be made in varying sizes: small, medium and large.

While any suitable configuration of the garment for covering the shoulders will suffice, the preferred design will incorporate a back panel, covering the area midway down the back and outwardly just past the break in the shoulders with curved corners at the lower extremities. Two front panels, a left front panel and a right front panel are attached at the apex of the shoulders by the conventional method of sewing, and overlapping in the front as in any shirt or blouse type of garment with, but not limited to, a hook-loop type of attachment. With the hook-loop attachment slight adjustments may be made for the varying sizes of the wearer, while with buttons, snaps and other conventional means of attachment there are similar adjustment capabilities, but all will work for the closure of the two frontal panels of the unique garment. These frontal panels will cover the upper chest area of the wearer from the apex of the shoulders to approximately two-thirds of the way down the chest, depending upon the size of the wearer. The frontal panels will have a curved configuration at the lower extremities matching those on the rear panel. The neckline of the garment may have any number of styles, "V" neck, square neck, or a curved neckline, giving a variety in styles while staying in the intended scope of the patent. The material of the preferred embodiment of the garment would be, but not limited to, 100% cotton, whereby it would be easily laundered, and available in a wide variety of bright and unique colors and patterns. This type of material would absorb the moisture and the bright colors would conceal some of the droppings. The droppings of small birds are often a white substance that when dry can be brushed off easily. A nonsliding material as in, but not limited to, a soft cotton flannel, will be used for the backing of all of the panels of the garment to prevent slipping with the movement of the bird. Holes in the apex area of the shoulders, with or without grommets will allow that ties be fed through to attach the wooden perches to the shoulders with a wide variety of colorful ties, with the preferred embodiment being a natural leather cured with vegetable tannin. The perches can be made from a wide variety of doweling materials, with the best being of oak. Birds have a tendency to chew on things, which wears down the natural growth from the ends of their beaks as in the fingernails on people, so a hard wood will last longer. Twigs of a similar size, with or without the bark still on them, can be used to give a more natural style to the garment appearance. Apertures will be drilled at both ends of the wood perches to communicate therethrough so that the attaching ties can be inserted and fastened with a conventional knot. One or a plurality of perches may be used on one or both shoulders to accommodate the size of the bird and traverse between shoulders. These ties may also be connected across the back between the shoulders to give the garment further style and allow the bird something to hold onto when going between perches.

Still another use for the tie ends will be the attachment of toys and other paraphernalia for entertaining the bird and making the garment more fun to wear. The panels may be turned inside out and sewn on the edges in a conventional manner for assembly, or may be edged with a colorful bias tape, which is another conventional method of manufacturing garments. It must be noted that, like adding toys to the inside of a bird's cage and adding pins to a funny hat, this garment is intended to be adorned in a number of ways by the wearer, but the adding of additional perches or like devices to the garment are included within the scope of this patent. Weights may be optionally added to the hem on both the front and back panels. This weight can be in the form of a chain, sand or bean bags, to be removed through a flap in the lining when the garment is being laundered. The weights in the garment have a greater importance as the size of the bird goes up, providing a lowered center of gravity for the garment and thus allowing the garment to stay in place while counterbalancing the weight and activity of the larger bird.

It is the object of this invention to create a garment whereby the wearer can transport varying sizes of pet birds in a relatively natural environment.

It is another object of this invention to create a device that protects the wearer's clothing, both front and back, from damage by a pet bird's droppings when transporting on the shoulder, or damage from the bird's talons or claws.

It is still another object of the invention to create a garment whereby the pet bird can rest on a natural round wooden dowel or tree limb affixed at the apex of the shoulder.

It is still another object of the invention to create a garment with a removable perch that can be taken off when laundering the garment and may be replaced by one of a plurality of perches of different diameters to accommodate the grip of the bird using it.

It is still another object of the invention to create a garment that may be made of a variety of bright and colorful materials enhancing and showing off the color of the pet birds.

It is another object of the invention to create a garment that may be made in varying sizes while being able to adjust within each size to make the garment fit tightly in the shoulders, restricting movement in the area of the removable perches.

It is still another object of the invention to create a garment that may be adjustably weighted in the front, back, or in both the front and back to balance the weight of varying size of pet birds.

It is yet another object of this invention to create a garment that can be easily adorned with toys and other paraphernalia to entertain the pet bird and enhance the garment. The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWING FIGURES

DETAILED DESCRIPTION OF THE PREFERRED EMBODIMENT

Figure 1:
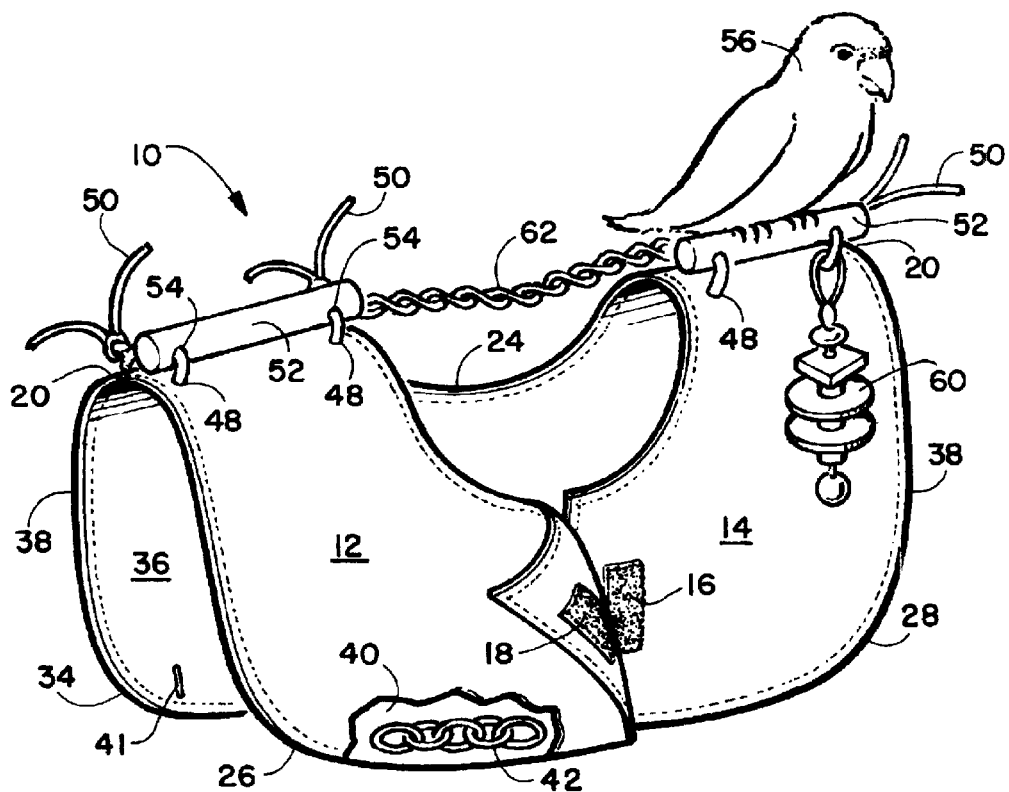
FIG. 1 is a frontal perspective view of the Body Perch garment device with two removable round wooden perches attached with ties at the apex of the shoulder areas, and a toy with a typical pet bird thereon. The cut-a-way in the right front panel shows the optional chain weighting of the garment.

FIG. 1 is a frontal perspective view of the Body Perch garment device 10 displaying a first panel depicted as the right frontal panel 12 and a second panel shown as the left frontal panel 14. The right frontal panel 12 is folded back displaying an optional means of attachment of the right frontal panel 12 to the left frontal panel 14 mating fasteners in the form of hook material 16 and loop material 18 attached to the garment device 10 by means of sewing, adhesive, or other conventional means of affixing of the fastener to the fabric of the garment device 10. Of course the means of attachment of the first panel to the second could be conventional fasteners such as snaps or hooks but the current best mode features the use of hook and loop fabric. The means of attachment of the right or first front panel 12 to the second or left front panel 14 also provides means for lateral transnational adjustment of the two front panels 12 and 14 in relation to each other. This means for laterally transnational adjustment allows the garment device 10 to be tightened in the apex of the shoulder area 20 in each separate size range by laterally translating the first panel toward and over the second panel and there after removably attaching them to each other using attachment of the hook and loop fabrics 12 and 14.

The front neck line 22 of the garment device 10 will be available in a number of variations in style, "V" neck, square neck, or curved neck, with the back neck line 24 retaining the conventional curved configuration. The lower extremities 26 and 28 of the frontal panels 12 and 14 in the current best mode have the curved configuration displayed in FIG. 1 but other shapes are anticipated.

The back panel 30 having the similar curved extremities 32 and 34 in the current best mode with the most stable mount extends approximately two-thirds of the way down the back of the wearer, depending upon their size. Of course different owners may wish to have this extension down the back larger or smaller, and styles may dictate a change also and such is anticipated.

The backing or inner surface 36 of the garment device 10 is currently best constructed of a soft cotton flannel material however, other materials could be used depending on the wearer comfort concerns. The edges 33 of the garment device 10 are configured in any conventional manner, one current mode being the turning of the garment device 10 in-side-out and sewing the edges 38, or edging the garment device 10 with a conventional bias tape.

Front panels 12 and 14 in the current best mode of the device 10 are provided with similar accessible cavities 40 where weights may be situated, such as chain 42 as shown in the current best mode. Of course other weighting material such as sand, cable, or similar conventional weighting products could be used. The weighted bottom edges of the device 10 provides a means to stabilize the garment device 10 on the shoulders of the user from movement by increasing friction on the user's body from the weight and lowering the center of gravity of the device 10 to resist movement during turns and stopping of the user. The back panel 30 has an accessible cavity 44, where a weight may also be placed. The weights such as chain 42 are used in the current best mode however it is envisioned that some users may wish to forgo the added weight, or adjust the amount of weight, and consequently the device may be provided. without them, or optionally with an access slot 41 communicating with the accessible cavity 44 and 40 to allow the removal or insertion of the chain 42 or similar weights at the option of the user. Of course placing heavier or lighter weights into the accessible cavities 40 and 44 through access slots 41 would provide a means of adjustment of the center of gravity of the device 10 by changing the amount of weight at the bottom of the device 10. By using the chain 46 as a means for lowering the center of gravity of the device 10 and means for adjustment of the same, the user can adjust the device to his or her personal preference and also limit its movement and achieve maximum aid in balancing the garment device 10 on the user's person with the weight of the pet bird 56 on the perch 52.

At the outer and inner distal sides of each shoulder area 20 are two orifices 48, with or without protective grommets or other edge protection. Ties 50 are attached to the shoulder through the orifices 48 and thereby provide a means of removable attachment of at least one of the depicted perches 52 to the garment device 10. While two perches 52 are preferable, it is envisioned that the device 10 could be made or used with only one perch 52 and a limited function, and such is anticipated. The ties 50, when in an attached position to the perches 52, communicate through apertures 54 in the perches and are therein tied to each other. Of course other means of attachment of the perches 52 to the device 10 might be used, however the current best mode uses the ties 50. Although only one perch 52 is shown on the apex 20 of each shoulder, it is understood that a plurality of perches may be mounted using similar means of attachment of the perches 50 and extend, either down the front panels 12 and 14, or down the back panel 30, or down both down front and back panel, while maintaining the same disclosed configuration. Such a configuration of multiple perches 52 would provide a ladder for the bird 56 to walk upon the device 10.

Further, a means of adjustment of the perch 52 size to accommodate the current grip or foot size of the bird 56 can be provided to user by providing a plurality of different diamatered perches 52. In this manner the user can choose the perch 52 having the appropriate diameter 53, to accommodate the foot or grip of the bird 56. When the bird 56 is young and has a small foot size and thus a smaller grip, a perch 52 having a smaller diameter 53 would be used. Once the bird ages and acquires a larger grip from an increase in body size, a larger diameter perch 53 can be mounted upon the device 10.

Figure 2:
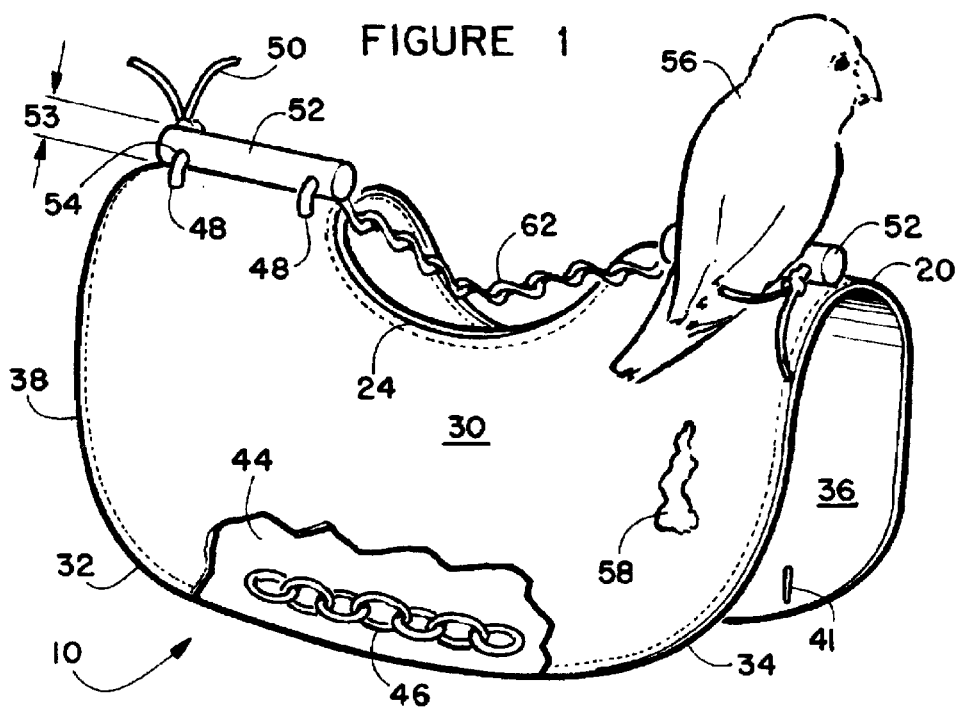
FIG. 2 is a rear perspective view of the Body Perch garment device with the removable round wooden perches attached with ties at the apex of the shoulders with a typical pet bird thereon. The cut-a-way in the rear panel displays the optional chain weighting of the garment.

A typical pet bird 56 resiting on the right perch 52 in FIG. 2 has the high probability of placing droppings 58 displayed on the back panel 30 during the bird's 56 daily tenure on the device 10. Since the device functions a means for protection of the clothing of the user from such droppings, material resistant and from which the droppings may be easily removed is used for the back panel 30.

A toy 60 is shown attached on the tie 50 of the left perch 52, although they may be attached to any of the tie straps 50 through the article. A means to entertain the bird 56 is thus provided by attachment of the toy 60 to the device 10 and the device 10 can be provided with a plurality of such toys 60 that are removably attachable to the device 10 to enhance this means to entertain the bird 56.

Additional function is provided by a means to traverse between perches 52 on opposing shoulders of the user, without touching the user. This means to traverse between perches is provided by the braided ties or connecting tether 62 which allows the bird 56 to translate between the two perches 52 by climbing onto the braided tether 62 as it goes from one side to the other. Of course other types of fabric or material can be used to form the connecting tether 62 but the current best mode features braided leather ties as they provide an excellent exterior for the bird 56 to grasp during traverse. This encourages the bird 56 to traverse between perches without touching the user's back, neck, or clothing, and to change positions, thus allowing the bird 56 more exercise as well as dispersing the birds weight on the user to two shoulders over time.

While all the fundamental characteristics and features of the body mountable bird perch device have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A body mountable bird perch formed as a vest comprising:
    a rear fabric panel;
    a first front panel communicating with said rear fabric panel at a first apex;
    a first shoulder slot formed under said first apex between said first front panel and said rear fabric panel;
    a second front panel communicating with said rear fabric panel at a second apex;
    a second shoulder slot formed under said second apex between said second front panel and said rear fabric panel;
    at least one perch;
    means of attachment of said perch to a top side of said vest;
    said perch being attached at one said one of said first apex or said second apex;
    means of releasable attachment of said first front panel to said second front panel to close a gap therebetween;
    a neck aperture, said neck aperture defined by the area between said rear panel, said first front panel and said second front panel, when said first front panel is attached to said second front panel; and
    wherein said means of releasable attachment provides a means of lateral translation of said first front panel in relation to said second front panel, whereby said neck aperture may be adjusted for size by adjustment of said means of lateral translation to vary the lateral translation of said first front panel in relation to said second front panel.

2. The device as defined in claim 1 further comprising:
    a plurality of said perches, said plurality of perches having at least one perch attached to said first apex and at least one perch attached to said second apex; and
    each of said plurality of perches so attached using said means of attachment of said perch to said vest.

3. The device as defined in claim 2 further comprising: means of adjustment of the center of gravity of said vest.

4. The device as defined in claim 3, wherein said means of adjustment of the center of gravity of said vest comprises a first cavity formed in a bottom edge of said rear fabric panel opposite said first apex and said second apex,
    a second cavity formed in a bottom edge of said first front panel;
    a third cavity formed in a bottom edge of said second front panel; and
    weights placed in said first cavity, said second cavity and said third cavity.

5. The device as defined in claim 4 wherein said weights are flexible chain.

6. The device as defined in claim 2 further comprising:
    each of said perches having defined diameter;
    means of adjustment of the diameters of said plurality of perches; and,
    said means of attachment of said perches to said vest each configured to allow said plurality of perches to be removably attached to said vest.

7. The device as defined in claim 6 wherein said means for adjustment of the diameters of said plurality of perches attached to said vest is kit of different perches having differing diameter removably attachable to said vest.

8. The device as defined in claim 6 wherein said means for attachment of said plurality of perches to said vest comprises:
    a pair of ties affixed to said vest for each of said plurality of perches;
    a pair of orifices at communicating through each of said perches at opposite ends of said perches; and
    one of said ties of each of said pair of ties communicating through each of said pair orifices on each individual perch and attacheable to the other of said pair of ties whereby each of said perches may be tied to said vest.

9. The device as defined in claim 2 further comprising a means or a bird to traverse from said one perch attached to said first apex to said one perch attached to said second apex without touching said vest or the user.

10. The device as defined in claim 9 wherein said a means for a bird to traverse from said one perch attached to said first apex to said one perch attached to said second apex without touching said vest or the user is a tether affixed therebetween.

11. The device as defined in claim 2 further comprising:
    a selectable bird toy from a group of attachable bird toys said selectable bird toy removably attacheable to said vest; and
    means to removably attach said selectable bird toy to said vest.

12. The device as defined in claim 1 further comprising: means of adjustment of the center of gravity of said vest.

13. The device as defined in claim 12 wherein said means of adjustment of the center of gravity of said vest comprises a first cavity formed in a bottom edge of said rear fabric panel opposite said first apex and said second apex,
    a second cavity formed in a bottom edge of said first front panel;
    a third cavity formed in a bottom edge of said second front panel; and
    weights placed in said first cavity, said second cavity and said third cavity.

14. The device as defined in claim 13 wherein said weights are flexible chain.

15. The device as defined in claim 1 further comprising:
    said perch having a defined diameter;
    means of adjustment of the diameter of said perch; and
    said means of attachment of said perch to said vest allows said perch to be removably attached to said vest.

16. The device as defined in claim 15 wherein said means for adjustment of the diameter of said perch attached to said vest is kit of different perches of differing diameter removably attachable to said vest, whereby a selected perch having the desired diameter may be removably mounted to said vest.

17. The device as defined in claim 15 wherein said means for attachment of said perch to said vest comprises:

a pair of ties affixed to said vest;

a pair of orifices at communicating through said perch at opposite ends of said perch;

one of said ties of each of said pair of ties communicating through each of said orifices and attachable to the other of said pair of ties whereby said perch may be tied to said vest.

18. The device as defined in claim 1 further comprising:

a bird toy; and means to attach said bird toy to said vest.

\* \* \* \* \*